United States Patent [19]
Takano et al.
[11] 4,337,469
[45] Jun. 29, 1982

[54] INK LIQUID SUPPLY SYSTEM FOR INK JET SYSTEM PRINTER

[75] Inventors: Rikuo Takano, Musashino; Yuji Sumitomo, Nara, both of Japan

[73] Assignees: Nippon Telegraph and Telephone Public Corp.; Sharp Kabushiki Kaisha, both of Osaka, Japan

[21] Appl. No.: 864,438

[22] Filed: Dec. 27, 1977

Related U.S. Application Data

[63] Continuation of Ser. No. 610,779, Sep. 5, 1975, abandoned.

[30] Foreign Application Priority Data

Sep. 6, 1974 [JP] Japan .................................. 49-103311

[51] Int. Cl.3 .......................................... G01D 15/18
[52] U.S. Cl. .......................................... 346/75; 101/366
[58] Field of Search .................. 101/366, 335; 346/75, 346/140; 219/300; 118/302, 602

[56] References Cited

U.S. PATENT DOCUMENTS

| | | | |
|---|---|---|---|
| 703,970 | 7/1902 | Quain | 219/300 |
| 2,478,917 | 8/1949 | Hain | 219/300 X |
| 3,105,136 | 9/1963 | Ashenfarb | 219/300 |
| 3,255,689 | 6/1966 | Kielsmeier et al. | 118/602 X |
| 3,371,186 | 2/1968 | Trabilcy | 219/300 |
| 3,653,932 | 4/1972 | Berry | 106/22 |
| 3,761,953 | 9/1973 | Helgeson et al. | 346/75 |
| 3,766,357 | 10/1973 | Koester, Jr. | 219/300 |
| 3,780,250 | 12/1973 | Ando | 219/300 |
| 3,878,519 | 4/1975 | Eaton | 346/140 X |
| 3,929,071 | 12/1975 | Cialone et al. | 197/1 R |

OTHER PUBLICATIONS

IBM Tech. Discl. Bulletin, Mar. 10, 1974, "Viscosity Control Circuit", vol. 16, No. 10, p. 3295, 'Two Level Ink Jet Deflection Control System', pp. 3308–3311.

*Primary Examiner*—J. Reed Fisher
*Attorney, Agent, or Firm*—Birch, Stewart, Kolasch & Birch

[57] ABSTRACT

In an ink jet system printer of the charge amplitude controlling type, it is required to ensure stable printing that viscosity and surface tension of ink liquid supplied to a nozzle is maintained at a constant value. To this end, there is provided a heat generating pipe in an ink supply system and a control circuit for controlling power supply to the heat generating pipe. The viscosity and surface tension of the ink liquid is maintained at a constant value by holding the ink liquid at a predetermined temperature.

10 Claims, 6 Drawing Figures

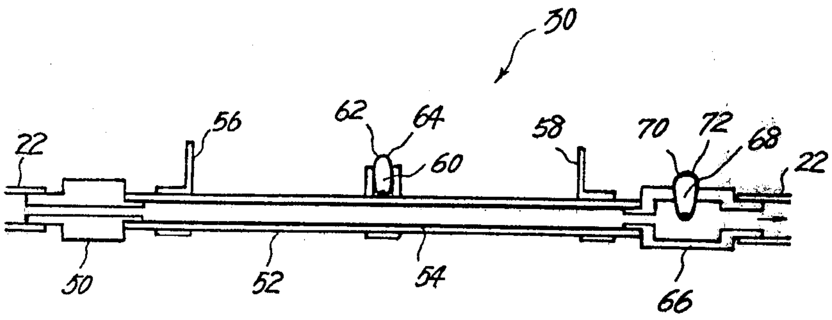
FIG. 3
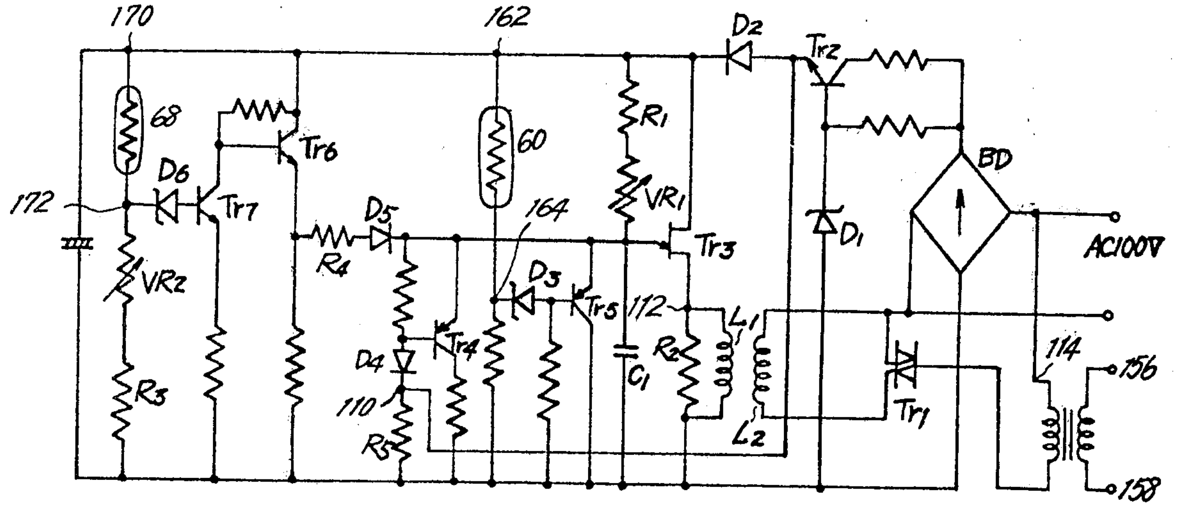
FIG. 4 (Control Circuit -100-)

INK LIQUID SUPPLY SYSTEM FOR INK JET SYSTEM PRINTER

This application is a continuation of copending application Ser. No. 610,779, filed on Sept. 5, 1975, and now abandoned.

BACKGROUND OF THE INVENTION

The present invention relates to an ink supply system in an ink jet system printer.

In general, in an ink jet system printer, ink droplets from a nozzle are issued toward a recording paper, and then desired ink droplets are deflected in a desired direction when they pass through an appropriate deflection means. The deflected ink droplets are deposited on the recording paper in order to record desired symbols corresponding to printing information supplied. Especially, in an ink jet system printer of the charge amplitude controlled type wherein an ink stream from a nozzle having an ultrasonic vibrator is broken into ink droplets at a given vibration frequency, and the individual ink droplets, being charged by a charging electrode in accordance with printing information, are deflected in accordance with the amplitude of charges carried thereon as they pass through an electrostatic field of a fixed high voltage thereby printing desired symbols such as alphabet characters, it is of importance that the application of charging signals is accurately timed to be in agreement with the droplet separation phase. Therefore, it is necessary to hold the predetermined phase relationship between the droplet separation and the ultrasonic vibration substantially constant.

The ink liquid used in the ink jet system printer as set forth above undergoes changes in physical constants such as the viscosity and surface tension thereof in a fashion dependent upon the ink liquid temperature. Therefore, it is necessary to maintain the ink liquid at a predetermined temperature in order to ensure stable printing.

It has been proposd to provide an ink liquid warmer in the ink supply system in order to hold the ink liquid at a predetermined temperature, and to maintain the viscosity and surface tension of the ink liquid at a predetermined value. The conventional ink liquid warmer as shown in our copending application Ser. No. 509,549 filed on Sept. 26, 1974 "INK LIQUID WARMER FOR INK JET SYSTEM PRINTER" now U.S. Pat. No. 4,007,684, issued Feb. 15, 1977, was not satisfactory in its response velocity.

OBJECTS AND SUMMARY OF THE INVENTION

Accordingly, an object of the present invention is to provide an ink jet system printer which ensures stable printing.

Another object of the present invention is to provide an ink liquid supply system for use in an ink jet system printer which holds the viscosity and surface tension of the ink liquid at a constant value.

Still another object of the present invention is to provide an ink liquid warmer in the ink supply system of which the response velocity is quite high.

Yet another object of the present invention is to provide a control circuit suitable for controlling power supply to the ink liquid warmer in the ink supply system.

Other objects and further scope of applicability of the present invention will become apparent form the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to one embodiment of the present invention, a heat generating pipe is provided in the ink supply system to warm and hold the ink liquid to be supplied to the nozzle at a predetermined temperature. Power supply to the heat generating pipe is controlled by a control circuit which responds to the temperature of the ink liquid.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIG. 3 is a sectional view of an embodiment of an ink liquid warmer of the present invention;

FIG. 4 is a circuit diagram of an embodiment of a control circuit for controlling power supply to the ink liquid warmer of FIG. 3.

DESCRIPTION OF THE PREFERRED EMBODIMENTS

Referring now in detail to the drawings, and to facilitate a more complete understanding of the present invention, the characteristics of the ink liquid used in the ink jet system printer of the present invention will be first described with reference to FIGS. 1(A) and 1(B).

Figure 1A:
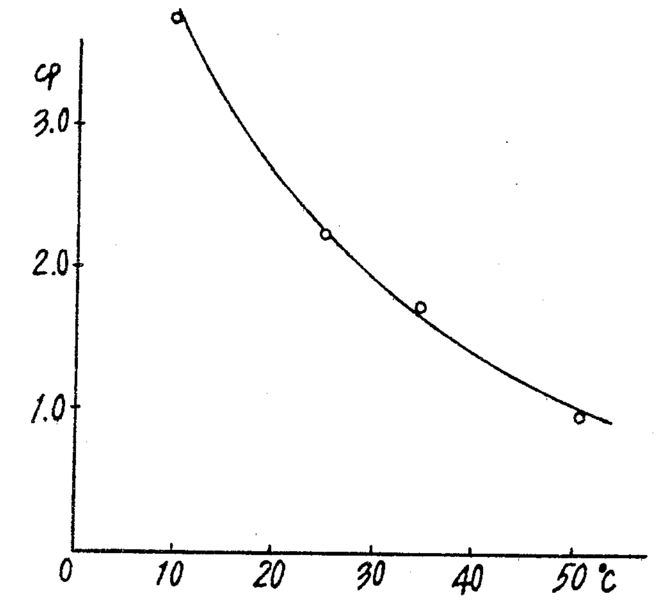
FIG. 1(A) is a graph showing viscosity versus ink liquid temperature characteristics of ink liquid used in an ink jet system printer.
Figure 1B:
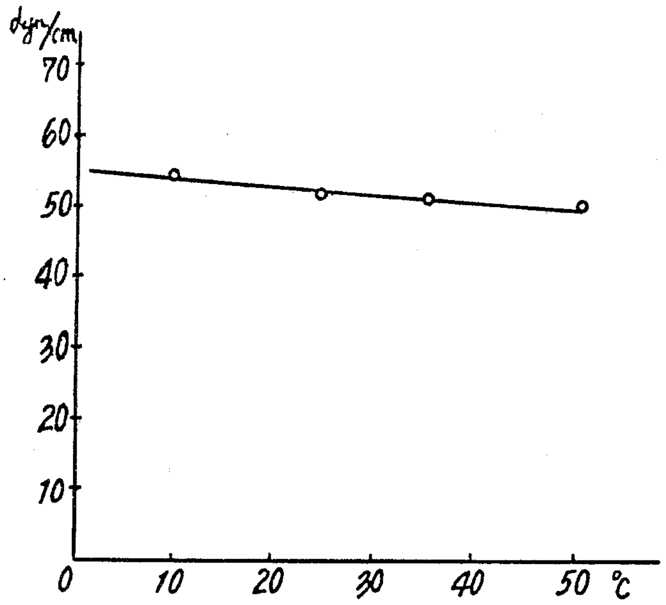
FIG. 1(B) is a graph showing surface tension versus ink liquid temperature characteristics of ink liquid used in an ink jet system printer.

FIG. 1(A) shows the relationship between the temperature (along the abscissa axis) and the viscosity (along the ordinate axis) of the ink liquid, and FIG. 1(B) shows the relationship between the temperature (along the abscissa axis) and the surface tension (along the ordinate axis) of the ink liquid.

It is clear from FIG. 1(A) that the viscosity of the ink liquid reduces by several tens percent when the liquid temperature increases from 10° C. to 50° C. A tip of a nozzle, which issues the ink liquid, is usually constituted by a capillary tube of 50–80 μm in diameter, and therefore the fluid resistance of the ink liquid passing therethrough is greatly influenced by the viscosity of the ink liquid. As the fluid resistance changes, the amount of the ink liquid issuing from the nozzle changes and hence the shade of the printed character may vary. Moreover, the ink droplet separation phase will change as the viscosity of the ink liquid changes, and the change of the ink droplet separation phase may preclude accurate printing. It is also clear from FIG. 1(B) that the surface tension of the ink liquid gradually reduces as the ink liquid temperature increases. The surface tension of the ink liquid also greatly influences the ink droplet separation phase. It can be concluded that the viscosity and surface tension of the ink liquid to be supplied to the nozzle must be maintained at a constant value in order to ensure stable printing, or, in other words the ink liquid must be held at a predetermined temperature without regard to ambient temperature conditions in order to perform accurate printing.

Figure 2:
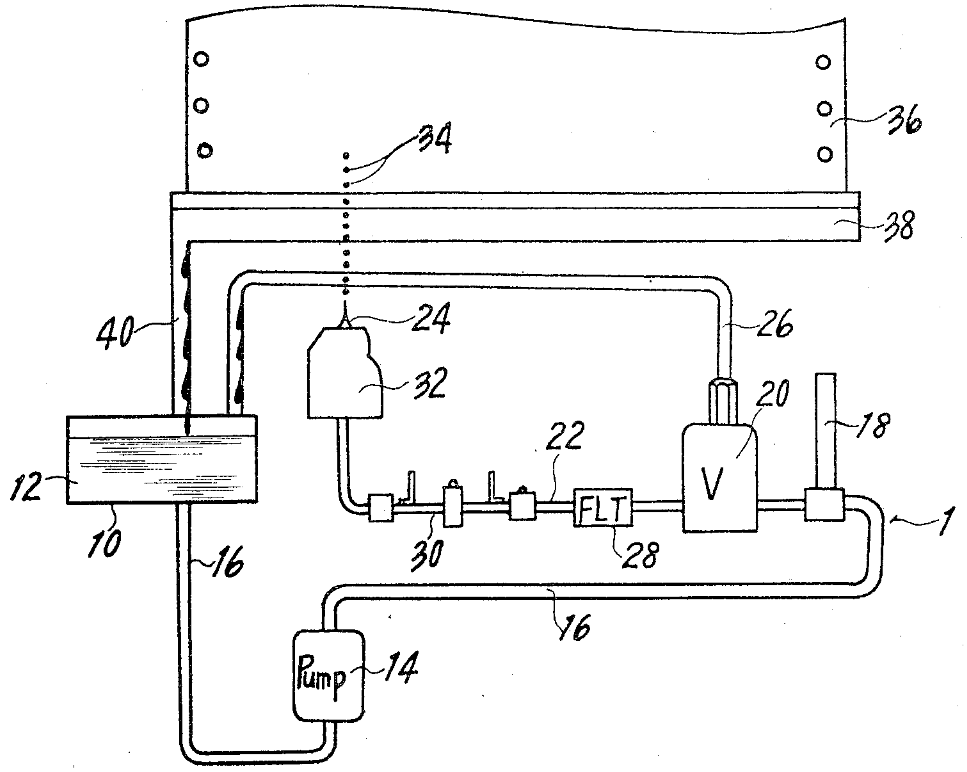
FIG. 2 is a schematic diagram showing an ink supply system embodying the present invention.

Referring now to FIG. 2, there is illustrated an ink supply system 1 of the present invention including an ink liquid warmer 30 within the ink supply system. Ink liquid 12 contained within an ink reservoir 10 is sent under pressure to an ink supply system 1 through a pump 14 and a conduit 16. An outlet side of the pump 14 is connected to an air chamber 18 to remove the pressure pulsation caused by the pump 14.

An electromagnetic cross valve 20 is provided for controlling the supply direction of the ink liquid 12. The ink liquid 12 is supplied from the pump 14 to a nozzle 24 through the conduit 16 and a conduit 22 when the printing operation is performed, and the ink liquid 12 is returned from the nozzle 24 and conducted to the ink reservoir 10 through the conduits 22 and 26 when the ink jet system printer ceases its operation. A rapid ink stream or pulse returning from the nozzle 24 to the electromagnetic cross valve 20 occurring at the time of termination of the printing operation tends to blow out or clean filter 28.

For example, the coil of the electromagnetic cross valve 20 is activated in order to connect the nozzle 24 with the pump 14, when the system is in an operative condition or the main power switch is ON. While if the coil of the electromagnetic cross valve 20 is disabled (When the main power switch of the system is OFF), the nozzle 24 is connected with the ink reservoir 10 through the conduit 26.

The filter 28 is provided for removing impurities included within the ink liquid 12 to be supplied to the nozzle 24 in order to prevent the capillary tube portion of the nozzle 24 from becoming blocked with said impurities. The reference number 30 represents an ink liquid warmer of the present invention, which holds the ink liquid 12 to be supplied to the nozzle 24 at a predetermined temperature without regard to the temperature condition of the ink supply system 1 or ambient conditions outside of the ink jet system printer, etc., in order to ensure stable printing. The detailed construction of the ink liquid warmer 30 will be described in detail hereinafter.

The nozzle 24 is held by an ink droplet issuance unit 32 including an electromechanical transducer such as a piezovibrator of a type well known in the art. The ink liquid 12 issuing from the nozzle 24 is excited by the electro-mechanical transducer so that ink droplets 34 of a frequency equal to the exciting signal frequency are formed. Charging signals corresponding to the printing information are applied to a charging electrode (not shown) and are timed in agreement with the ink droplet separation phase in order to charge the individual ink droplets with the charge amplitude corresponding to the printing information in a manner well known in the art. As the ink droplets 34 charged with the charging signals pass through a high voltage electric field established by a pair of high voltage deflection plates (not shown), droplets 34 are deflected in accordance with the amplitude of charges on the droplets and deposited on a recording paper 36 to print a desired pattern. The ink droplets not contributive to writing operation are neither charged nor deflected and are directed toward a beam gutter 38 in order to recirculate the waste ink liquid to the ink reservoir 10 through a conduit 40.

FIG. 3 is a sectional view showing an embodiment of the ink warmer 30.

The conduit 22 is made of resin such as vinyl chloride or vinylidene chloride. The ink liquid supplied through the conduit 22 is conducted into a heat generating pipe 52 via an inlet hollow coupler 50 made of electrically insulating material having the characteristics of high heat insulation, high thermal stability and low thermal conductivity. The inlet hollow coupler 50 is preferably made of acetal resin such as Delrin fabricated by Dupont and functions to protect the resin conduit 22 from being damaged by the heat energy generated by the heat generating pipe 52 and also to prevent the occurrence of current flow from the edge of the heat generating pipe 52 through the ink liquid. The heat generating pipe 52 is made of a thin resistance metal pipe such as a pipe made of stainless steel and, therefore, there is little possibility of accidental braking of the heat generating pipe 52 and, moreover, a high response velocity can be achieved since the ink liquid is directly heated by the heat generating pipe 52 of considerably low heat capacity.

The inner surface of the heat generating pipe 52 is coated with an electrically insulating thin film 54 made of, for example, glass. The thin film 54 functions to electrically insulate the ink liquid from the heat generating pipe 52 and to prevent the creation of electrolyzed impurities within the ink liquid. Terminals 56 and 58 of the heat generating pipe 52 are connected with output terminals 156 and 158 of a control circuit 100, which will be described hereinbelow with reference to FIG. 4, to control the ink liquid temperature.

A protect sensor 60 made of, for example, a positive temperature coefficient thermistor is attached to the center portion of the outer surface of the heat generating pipe 52 to inhibit the accidental temperature rise of the heat generating pipe 52, thereby preventing the occurrence or creation of bubbles in the ink liquid and protecting the thin film 54 from being damaged. Terminals 62 and 64 of the protect sensor 60 are connected with terminals 162 and 164 in the control circuit 100, respectively.

The ink liquid passed through the heat generating pipe 52 and warmed up to a predetermined temperature is conducted to the nozzle 24 via an outlet hollow coupler 66 and a conduit 22. The outlet coupler 66 is made of the same material and functions in a same manner as that of the inlet coupler 50. A temperature sensor 68 is provided at the outlet coupler 66 to control the ink liquid temperature. Terminals 70 and 72 of the temperature sensor 68 are connected with terminals 170 and 172 in the control circuit 100, respectively in order to feed back the ink liquid temperature to the control circuit 100.

Detailed circuit construction and an operation mode of the control circuit 100 will be described with reference to FIGS. 4 and 5.

AC power of 100 V is rectified by a rectifier BD and converted into a DC voltage of a predetermined voltage value, in this embodiment 12 V, of which a waveform is shown in FIG. 5(A) by a transducer $Tr_2$ and a Zener diode $D_1$. The signal A shown in FIG. 5(A) repeats the same waveforms every time distance of period t and, therefore, the signal A can be utilized as a synchronization signal for the power source.

A field-effect transistor $Tr_3$ functions to control the voltage supply to the heat generating pipe 52. The drain of the field-effect transistor $Tr_3$ is connected with the emitter of the transistor $Tr_2$ via a diode $D_2$, whereas the source of the field-effect transistor $Tr_3$ is connected with a parallel connection comprising a resistor $R_2$ and a coil $L_1$. The coil $L_1$ is associated with a coil $L_2$ which is connected with a triac $Tr_1$. When the triac $Tr_1$ is ON, the output terminals 156 and 158 provide the AC voltage output.

The field-effect transistor $Tr_3$ is controlled to be ON and OFF by a time constant circuit comprising a resistor $R_1$, a variable resistor $VR_1$ and a capacitor $C_1$, especially, by the voltage difference across the capacitor $C_1$.

The temperature sensor 68 made of a positive temperature coefficient thermistor is connected with a variable resistor $VR_2$ and a resistor $R_3$ in a series fashion. The connection point between the temperature sensor 68 and the variable resistor $VR_2$ is connected with the base of a transistor $Tr_7$ through a Zener diode $D_6$. The Zener diode $D_6$ functions to maintain a predetermined voltage difference between the terminal 172 and the emitter of the transistor $Tr_7$.

An amplifying transistor $Tr_6$ is connected with the capacitor $C_1$ via a resistor $R_4$ and a diode $D_5$ which forms another time constant loop. A transistor $Tr_4$ functions to form a discharge loop of the capacitor $C_1$ in unison with a diode $D_4$ and a resistor $R_5$ in synchronization with the synchronization signal A.

The protect sensor 60 is connected with the base of a transistor $Tr_5$ via a Zener diode $D_3$. The Zener diode $D_3$ and the transistor $Tr_5$ in combination function to establish a discharge loop for the capacitor $C_1$ when the protect sensor 60 detects an accidental temperature rise.

The operation mode of the control circuit 100 is as follows:

When the temperature of the ink liquid is above a predetermined value, for example, above 50° C., the resistance value of the temperature sensor 68 increases and hence the voltage potential at the terminal 172 decreases and, therefore, the transistors $Tr_6$ and $Tr_7$ are OFF. At this time the capacitor $C_1$ is charged through the resistor $R_1$ and the variable resistor $VR_1$. The charging velocity is very slow and, therefore, the discharging loop through the transistor $Tr_4$ is established before the voltage difference across the capacitor $C_1$ reaches the voltage level sufficient to turn ON the field-effect transistor $Tr_3$.

The voltage difference across the capacitor $C_1$ increases in the waveform shown in FIG. 5(B), but the charge stored on the capacitor $C_1$ is discharged through the transistor $Tr_4$ when the signal A applied to a point 110 bears the ground potential. The field-effect transistor $Tr_3$ is maintained OFF and, therefore, waveforms at points 112 and 114 are the same as shown in FIGS. 5(C) and 5(D), respectively, and hence, the output terminals 156 and 158 provide no voltage potential.

When the temperature of the ink liquid is below the predetermined value, for example, below 50° C., the resistance value of the temperature sensor 68 decreases and hence the voltage potential at the terminal 172 increases and, therefore, the transistor $Tr_7$ is turned ON. The transistor $Tr_6$ is ON when the transistor $Tr_7$ is ON and, therefore, a charging loop $Tr_6 \rightarrow R_4 \rightarrow D_5 \rightarrow C_1$ for the capacitor $C_1$ is established to rapidly charge the capacitor $C_1$.

Figure 5:
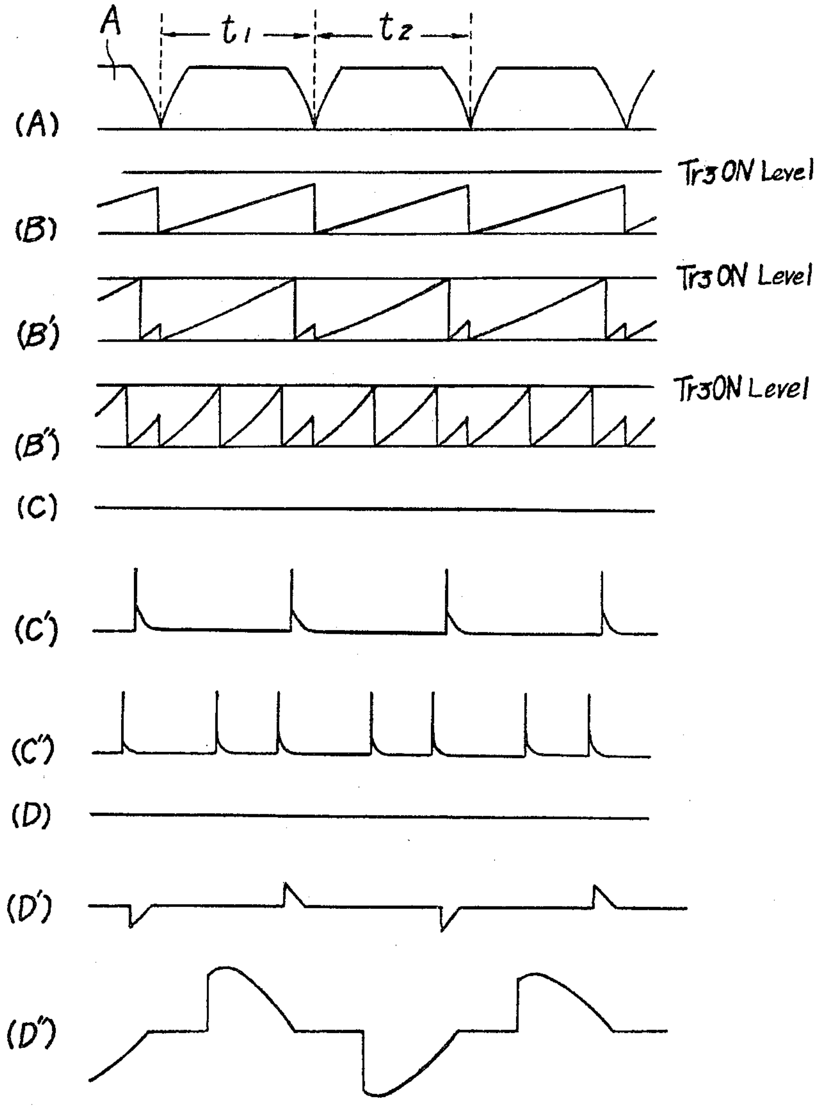
FIG. 5 is a time chart showing waveforms occurring within the circuit of FIG. 4.

The capacitor $C_1$ is charged by the voltage of which the waveform is shown in FIG. 5(B') and, therefore, the voltage difference across the capacitor $C_1$ reaches the level sufficient to turn ON the field-effect transistor $Tr_3$ before the discharge loop is established in synchronization with the signal A. A pulse as shown in FIG. 5(C') is generated upon turning ON of the field-effect transistor $Tr_3$ and the triac $Tr_1$ is turned ON via the coil $L_2$. The triac $Tr_1$ is maintained ON till the voltage difference between the two terminals thereof decreases to the ground potential and, therefore, the voltage power of AC 100 V is generated from the output terminals 156 and 158 via the triac $Tr_1$ while the triac $Tr_1$ is ON as shown in FIG. 5(D'). In this way the heat generating pipe 52 is connected to receive the power supply to warm or heat up the ink liquid.

When the ink liquid temperature is considerably below the predetermined value, the current flow through the transistor $Tr_6$ increases and the capacitor $C_1$ is charged by the voltage of which the waveform is shown in FIG. 5(B''). The capacitor $C_1$ is charged up in a very short time period to turn the field-effect transistor $Tr_3$ ON and, therefore, the heat generating pipe 52 receives the voltage of which the waveform is shown in FIG. 5(D''). In this way the ink liquid is rapidly heated up by the heat generating pipe 52 when the ink liquid temperature is considerably low since the electric power supplied to the heat generating pipe 52 is increased.

When the heat generating pipe 52 is accidentally heated to reach a considerably high temperature, the protect sensor 60 turns ON the transistor $Tr_5$, thereby establishing the discharge loop for the capacitor $C_1$. The field-effect transistor $Tr_3$ is forced to maintain the OFF state. The power supply to the heat generating pipe 52 is precluded and, therefore, the temperature of the heat generating pipe 52 will fall down.

The invention being thus described, it will be obvious that the same way be varied in many ways. Such variations are not to be regarded as a departure from the spirit and scope of the invention, and all such modifications are intended to be included within the scope of the following claims.

What is claimed is:

1. In an ink liquid supply system for an ink jet system printer which emits ink droplets from a nozzle toward a recording paper, selectively deflects said ink droplets by a deflection means, and prints desired symbols on said recording paper with said deflected ink droplets, the improvements comprising:

a. an ink liquid reservoir for containing the ink liquid therein;

b. means including a heat generating pipe for supplying ink to said nozzle;

c. a first conduit means for connecting said ink liquid reservoir with said heat generating pipe;

d. a second conduit means for connecting said heat generating pipe with said nozzle; and e. a control circuit means for controlling the power supply to said heat generating pipe including a protect temperature sensing means operatively connected to said heat generating pipe for preventing accidental temperature fluctuations of said heat generating pipe and an ink liquid temperature sensing means for regulating the temperature of the said heat generating pipe in order to warm the ink liquid to a predetermined temperature and stabilize the viscosity and surface tension of said ink liquid supplied to said nozzle.

2. The ink liquid supply system of claim 1, wherein the heat generating pipe is made of thin stainless steel and both ends of which are connected to receive power supply from the control circuit.

3. The ink liquid supply system of claim 1, wherein the inner surface of the heat generating pipe is coated with an electrically insulating thin film.

4. The ink liquid supply system of claim 1, wherein there is further provided:

an inlet hollow coupler for coupling the first conduit means with the heat generating pipe; and an outlet hollow coupler for coupling the second conduit means with the heat generating pipe.

5. The ink liquid supply system of claim 4, wherein the inlet hollow coupler and the outlet hollow coupler are made of acetal resin.

6. The ink liquid supply system of claim 1, wherein said protect temperature sensing means precludes the power supply to the heat generating pipe when the heat generating pipe is at a considerably high temperature.

7. The ink liquid supply system of claim 6, wherein the protect temperature sensing means is attached to the center portion of the outer surface of said heat generating pipe.

8. The ink liquid supply system of claim 6, wherein the protect temperature sensing means is made of a positive temperature coefficient thermistor.

9. The ink liquid supply system according to claim 1, wherein there is further provided:

an inlet hollow coupler for coupling the first conduit means with said heat generating pipe;

an outlet hollow coupler for coupling the second conduit means with the heat generating pipe; and said ink liquid temperature sensing means for regulating the temperature of said heat generating pipe is provided at the outlet hollow coupler.

10. The ink liquid supply system of claim 9, wherein the ink liquid temperature sensing means is made of a positive temperature coefficient thermistor.

* * * * *